(12) United States Patent
Tatourian et al.

(10) Patent No.: US 10,154,233 B2
(45) Date of Patent: Dec. 11, 2018

(54) TECHNOLOGIES FOR SCENE RECONSTRUCTION

(71) Applicant: Intel Corporation, Santa Clara, CA (US)

(72) Inventors: Igor Tatourian, Santa Clara, CA (US); Rita Wouhaybi, Portland, OR (US); Peter Brink, Tempe, AZ (US); Peter Iskiyan, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 210 days.

(21) Appl. No.: 14/998,307

(22) Filed: Dec. 26, 2015

(65) Prior Publication Data

US 2017/0187994 A1   Jun. 29, 2017

(51) Int. Cl.
*H04N 7/18* (2006.01)
*G06K 9/00* (2006.01)
*G06F 17/30* (2006.01)
*H04L 29/08* (2006.01)

(52) U.S. Cl.
CPC ....... *H04N 7/185* (2013.01); *G06F 17/30268* (2013.01); *G06K 9/00791* (2013.01); *H04L 67/1097* (2013.01); *H04N 7/181* (2013.01)

(58) Field of Classification Search
CPC .......... G06K 9/00791; G06F 17/30268; H04N 7/185; H04N 7/181; H04L 67/1097
See application file for complete search history.

(56) References Cited

U.S. PATENT DOCUMENTS

| | | | |
|---|---|---|---|
| 9,129,179 B1 * | 9/2015 | Wong | G06K 9/20 |
| 9,858,438 B2 * | 1/2018 | Rueger | G06F 21/6254 |
| 2012/0167189 A1 * | 6/2012 | Aichroth | H04L 9/006 726/7 |
| 2013/0208966 A1 * | 8/2013 | Zhao | G06F 9/5072 382/131 |
| 2014/0342331 A1 * | 11/2014 | Freeman | G09B 23/288 434/265 |

* cited by examiner

*Primary Examiner* — Huy T Nguyen
(74) *Attorney, Agent, or Firm* — Barnes & Thornburg, LLP

(57) ABSTRACT

Technologies for scene reconstruction include a compute system to determine a context of at least one image of a scene captured by a camera of the compute system and generate metadata for the at least one image based on the determined context such that the metadata identifies the determined context of the compute system. The compute system further anonymizes the metadata to generate anonymized data that maintains privacy of the compute system and transmits the anonymized data to a cloud server for multi-dimensional reconstruction of the scene.

23 Claims, 5 Drawing Sheets

TECHNOLOGIES FOR SCENE RECONSTRUCTION

BACKGROUND

Surveillance cameras are often used to monitor the physical environment and record a history of events, which allows law enforcement personnel and other individuals to review the recorded data at a later date (e.g., to establish evidence of the occurrence of a particular event, to retrace a person's steps, etc.). In some cities around the world, surveillance cameras may be found on nearly every corner for such a purpose. In order to determine what occurred at a particular point in time, an inquirer may manually review camera footage from each of the relevant cameras and conjecture as to what actually occurred.

Additionally, modern vehicles often include one or more cameras (e.g., rear-facing cameras, front-facing cameras, and/or side-facing cameras), which may be used for a wide variety of purposes. For example, vehicle-based cameras may be used to assist the driver in collision avoidance (e.g., when reversing, when approaching another vehicle quickly, when parallel parking, etc.), lane keeping, and/or various other aspects.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
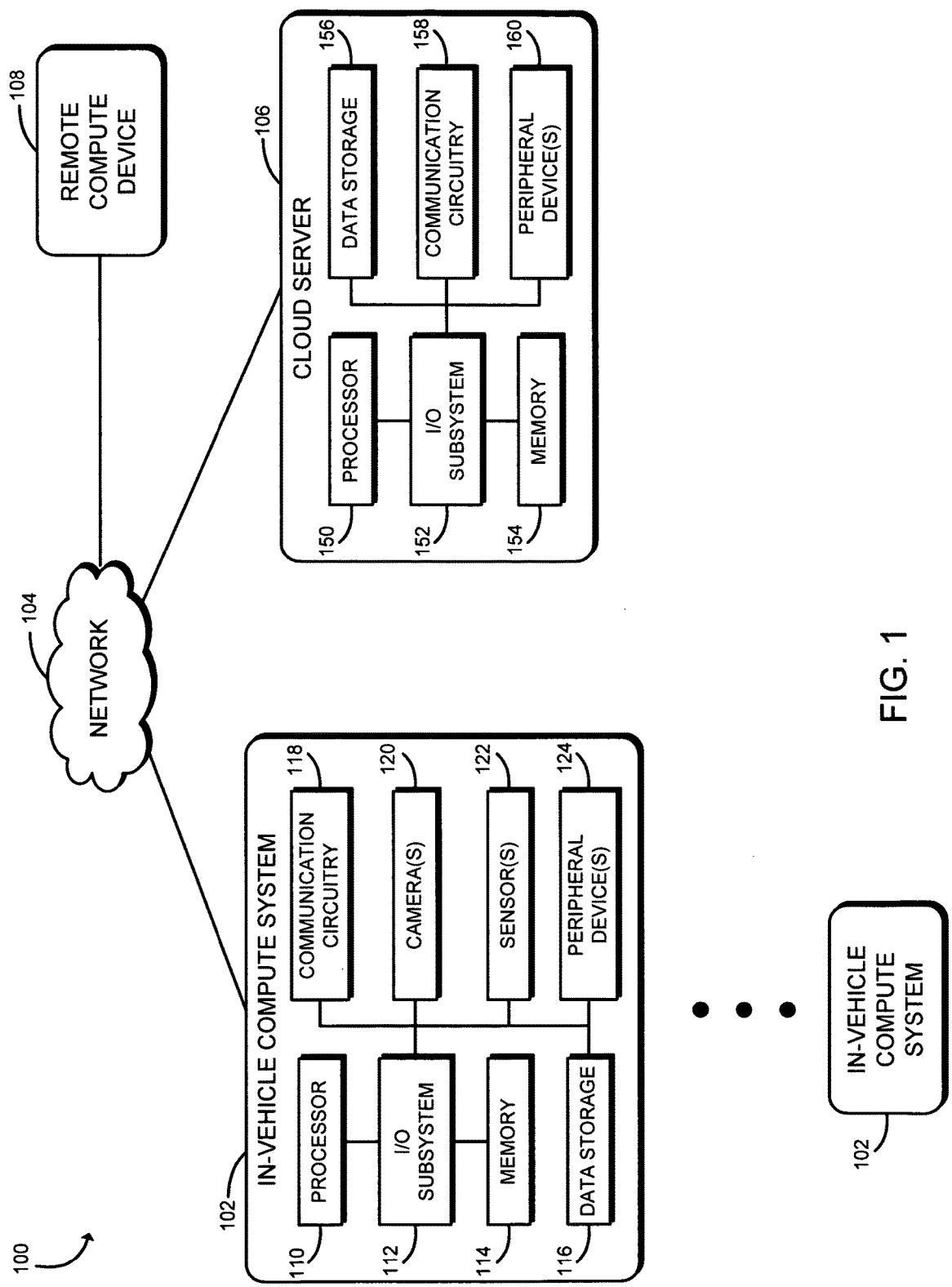
FIG. 1 is a simplified block diagram of at least one embodiment of a system for scene reconstruction.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system for scene reconstruction includes one or more in-vehicle compute systems 102, a network 104, a cloud server 106, and a remote compute device 108. Although only one network 104, one cloud server 106, and one remote compute device 108 are illustratively shown in FIG. 1, the system 100 may include any number of networks 104, cloud servers 106, and/or remote compute devices 108 in other embodiments. For example, in some embodiments, multiple remote compute devices 108 may request image data, sensor data, and/or a reconstructed scene from the cloud server 106.

As described in detail below, in the illustrative embodiment, one or more of the in-vehicle compute systems 102 (e.g., each in-vehicle compute system 102) are configured to determine a context of image/sensor data captured by the corresponding in-vehicle compute system 102 and generate corresponding metadata based on the determined context. Further, in the illustrative embodiment, each of the in-vehicle compute systems 102 anonymizes the metadata to maintain the privacy of that in-vehicle compute system 102 (i.e., the compute system 102 from which the image/sensor data was generated) and transmits the anonymized data to the cloud server 106 for processing and storage. It should be appreciated that, in some embodiments, metadata is transmitted instead of the actual image/sensor data in order to reduce the processing, bandwidth, and/or storage requirements of the system 100. The cloud server 106 may receive a request for image/sensor data associated with a particular context (e.g., associated with a traffic accident that occurred at a given time/location) and identify the image/sensor data to request from the corresponding in-vehicle compute systems 102 based on the stored metadata corresponding with the context. Depending on the particular embodiment, the request may be received from the remote compute device 108, the cloud server 106 (e.g., via a user interface), or one of the in-vehicle compute systems 102. As described below, it should be appreciated that the metadata may be stored anonymously such that the cloud server 106 may be unable to precisely determine the in-vehicle compute systems 102 from which the metadata was received. Accordingly, the cloud server 106 may transmit an anonymized request to the in-vehicle compute system(s) 102 for image/sensor data corresponding with the metadata/context and receive that data from the corresponding compute system(s) 102. As described herein, in some embodiments, pseudonym certificates may be used to maintain the privacy of the in-vehicle compute systems 102 while permitting the transmittal of data between devices in the system 100. Based on the image/sensor data, the cloud server 106 may reconstruct a multi-dimensional scene (e.g., 3D image(s), 3D video, etc.) associated with the received image/sensor data. Further, the cloud server 106 may transmit the image/sensor data and/or the reconstructed scene to the requesting device.

In the illustrative embodiment, each in-vehicle compute system 102 is included in a wheeled passenger vehicle (e.g., a car, truck, truck-tractor, bus, etc.). In other embodiments, the vehicle(s) may be embodied as another type(s) of vehicle (e.g., as a rail-driven vehicle, aircraft, maritime vessel, unmanned vehicle, drone, or another vehicle suited for application of the described techniques and mechanisms) or other moveable apparatus. The in-vehicle compute system 102 may be embodied as any type of computing system capable of performing the functions described herein. For example, in some embodiments, the in-vehicle compute system 102 may be embodied as, or form a portion of, an in-vehicle infotainment system, a navigation system, and/or another vehicle-based computing system. In other embodiments, the in-vehicle compute system 102 may instead be embodied as a standalone computing device or computing system. Of course, it should be appreciated that, in some embodiments, one or more of the in-vehicle compute systems 102 may be embodied as another mobile or stationary compute system (e.g., a smartphone, cellular phone, wearable computing device, personal digital assistant, mobile Internet device, tablet computer, netbook, notebook, Ultrabook™, laptop computer, and/or any other computing/communication device). However, for clarity and simplicity of the description, each of the in-vehicle compute systems 102 is described as a vehicle-based computing system.

As shown in FIG. 1, each of the illustrative in-vehicle compute systems 102 includes a processor 110, an input/output ("I/O") subsystem 112, a memory 114, a data storage 116, a communication circuitry 118, one or more cameras 120, one or more sensors 122, and one or more peripheral devices 124. Of course, each in-vehicle compute system 102 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. For example, the memory 114, or portions thereof, may be incorporated in the processor 110 in some embodiments.

The processor 110 may be embodied as any type of processor capable of performing the functions described herein. For example, the processor 110 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the in-vehicle compute system 102 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the in-vehicle compute system 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the in-vehicle compute system 102, on a single integrated circuit chip.

The data storage 116 may be embodied as any type of device or devices configured for short-term or long-term storage of data such as, for example, memory devices and circuits, memory cards, hard disk drives, solid-state drives, or other data storage devices. The data storage 116 and/or the memory 114 may store various data during operation of the in-vehicle compute system 102 as described herein.

The communication circuitry 118 may be embodied as any communication circuit, device, or collection thereof, capable of enabling communications between the in-vehicle compute system 102 and other remote devices (e.g., the cloud server 106) over a network (e.g., the network 104). The communication circuitry 118 may be configured to use any one or more communication technologies (e.g., wireless or wired communications) and associated protocols (e.g., Ethernet, Bluetooth®, Wi-Fi®, WiMAX, LTE, 5G, etc.) to effect such communication.

The one or more cameras 120 are configured to capture images or video (i.e., collections of images or frames) and capable of performing the functions described herein. It should be appreciated that each of the cameras 120 may be embodied as any peripheral or integrated device suitable for capturing images, such as a still camera, a video camera, or other device capable of capturing video and/or images. As indicated below, in the illustrative embodiment, each of the cameras 120 may be embodied as a three-dimensional (3D) camera or be otherwise configured to generate 3D/depth images. Such 3D cameras include, for example, depth cameras, bifocal cameras, stereo cameras and/or cameras otherwise capable of generating a depth image, channel, or stream. For example, one or more cameras may include an infrared (IR) projector and an IR sensor such that the IR sensor estimates depth values of objects in the scene by analyzing the IR light pattern projected on the scene by the IR projector. In another embodiment, one or more of the cameras 120 include at least two lenses and corresponding sensors configured to capture images from at least two different viewpoints of a scene (e.g., a stereo camera). In some embodiments, a particular vehicle may include front-, side-, and/or rear-facing cameras 120. Of course, the cameras 120 may be otherwise positioned on the vehicle in other embodiments.

The sensors 122 may be embodied as any sensors configured to generate data/signals indicative of an environment or context of the in-vehicle compute system 102. In various embodiments, the sensors 122 may be embodied as, or otherwise include, for example, inertial sensors (e.g., an inertial measurement unit (IMU)), position sensors, location sensors (e.g., global positioning system (GPS) sensor), temporal sensors (e.g., clocks) proximity sensors, optical sensors, light sensors, audio sensors, temperature sensors, motion sensors, piezoelectric sensors, radar sensors, lidar sensors, ultrasound sensors, IR sensors, image sensors (e.g., cameras), and/or other types of sensors. Of course, the in-vehicle compute system 102 may also include components and/or devices configured to facilitate the use of the sensor(s) 122. Depending on the particular embodiment, the sensors 122 may include hardware sensors and/or software sensors (e.g., software sensors to identify software applications executed at a particular point in time).

The peripheral devices 124 may include any number of additional peripheral or interface devices, such as speakers, microphones, additional storage devices, and so forth. The particular devices included in the peripheral devices 124 may depend on, for example, the type and/or intended use of the in-vehicle compute system 102 (e.g., whether the in-vehicle compute system 102 is a stand-alone system or incorporated into a larger in-vehicle infotainment system).

The network 104 may be embodied as any type of communication network capable of facilitating communication between the in-vehicle compute system(s) 102 and remote devices (e.g., the cloud server 106). As such, the network 104 may include one or more networks, routers, switches, computers, and/or other intervening devices. For example, each network 104 may be embodied as or otherwise include one or more cellular networks, telephone networks, local or wide area networks, publicly available global networks (e.g., the Internet), an ad hoc network, or any combination thereof.

The cloud server 106 may be embodied as any type of computing device capable of performing the functions described herein. For example, in some embodiments, the cloud server 106 may be embodied as a server, rack-mounted server, blade server, desktop computer, laptop computer, tablet computer, notebook, netbook, Ultrabook™, cellular phone, smartphone, personal digital assistant, mobile Internet device, wearable computing device, Hybrid device, and/or any other computing/communication device. As shown in FIG. 1, the illustrative cloud server 106 includes a processor 150, an I/O subsystem 152, a memory 154, a data storage 156, a communication circuitry 158, and one or more peripheral devices 160. Each of the processor 150, the I/O subsystem 152, the memory 154, the data storage 156, the communication circuitry 158, and/or the peripheral devices 160 may be similar to the corresponding components of the in-vehicle compute system 102. As such, the description of those components of the in-vehicle compute system 102 is equally applicable to the described of those components of the cloud server 106 and is not repeated herein for clarity of the description.

The remote compute device 108 may be embodied as any type of computing device capable of performing the functions described herein. For example, in some embodiments, the remote compute device 108 may be embodied as a desktop computer, workstation, server, laptop computer, tablet computer, notebook, netbook, Ultrabook™, cellular phone, smartphone, personal digital assistant, mobile Internet device, wearable computing device, Hybrid device, and/or any other computing/communication device. Further, the remote compute device 108 may include components similar to those of the in-vehicle compute system 102 discussed above. The description of those components of the in-vehicle compute system is equally applicable to the description of components of the remote compute device 108 and is not repeated herein for clarity of the description. Further, it should be appreciated that the remote compute device 108 may include other components, sub-components, and devices commonly found in a computing device, which are not discussed above in reference to the in-vehicle compute system 102 and not discussed herein for clarity of the description. In some embodiments, one or more of the components of the in-vehicle compute system 102 may be omitted from the remote compute device 108.

Figure 2:
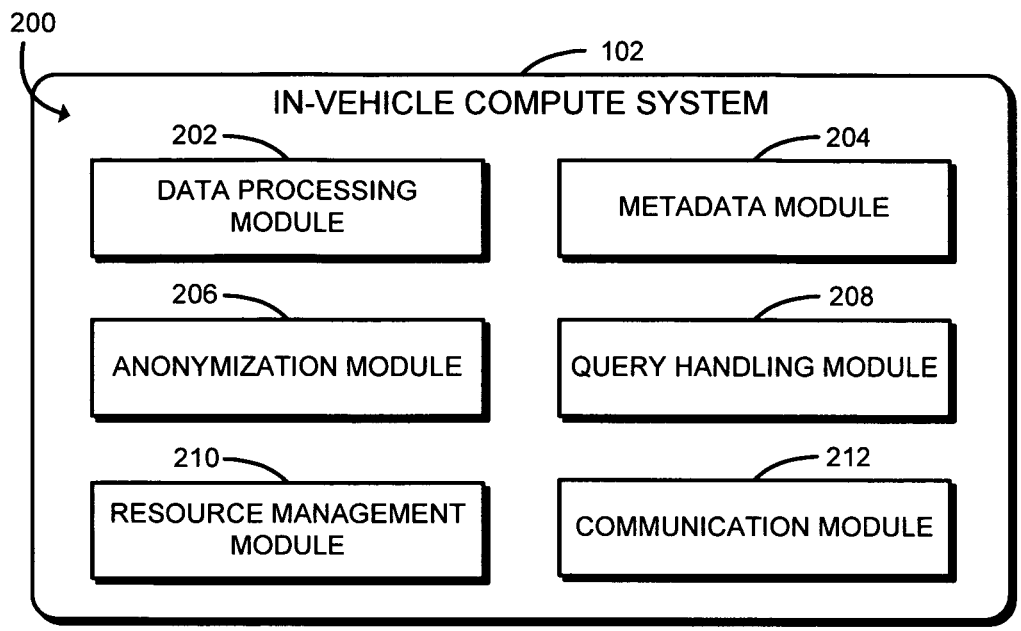
FIG. 2 is a simplified block diagram of at least one embodiment of an environment of an in-vehicle compute system of the system of FIG. 1.

Referring now to FIG. 2, in use, the in-vehicle compute system 102 establishes an environment 200 for scene reconstruction. The illustrative environment 200 includes a data processing module 202, a metadata module 204, an anonymization module 206, a query handling module 208, a resource management module 210, and a communication module 212. The various modules of the environment 200 may be embodied as hardware, software, firmware, or a combination thereof. For example, the various modules, logic, and other components of the environment 200 may form a portion of, or otherwise be established by, the processor 110 or other hardware components of the in-vehicle compute system 102. As such, in some embodiments, one or more of the modules of the environment 200 may be embodied as circuitry or collection of electrical devices (e.g., a data processing circuitry, a metadata circuitry, an anonymization circuitry, a query handling circuitry, a resource management circuitry, and/or a communication circuitry). Additionally, in some embodiments, one or more of the illustrative modules may form a portion of another module and/or one or more of the illustrative modules may be independent of one another.

The data processing module 202 is configured to process (e.g., pre-process) data generated/collected by the cameras 120 and/or the sensors 122 of the in-vehicle compute system 102. As described below, in some embodiments, the data processing module 202 may pre-process one or more images captured by the cameras 120 to determine an event associated with a context of the collected data and/or of the in-vehicle compute system 102. For example, the data processing module 202 may analyze the images and/or other sensor data to determine the data corresponds with the occurrence of a traffic accident.

The metadata module 204 is configured to determine the context of the captured images and/or collected sensor data of the in-vehicle compute system 102 and generate metadata for the captured/collected data based on the determined context. In the illustrative embodiment, the context is indicative of one or more characteristics of the images and/or sensor data and may be determined, for example, based on data generated by one or more of the sensors 122 of the compute system 102. For example, in some embodiments, the context may include the location of the in-vehicle compute system 102, the time at which the data was generated/collected by the cameras 120 and/or sensors 122, and/or other contextual information related to the collection of the data. As discussed above, in some embodiments, the in-vehicle compute system 102 may determine an event associated with the data. In such embodiments, the context may include the determined event. It should be appreciated that the metadata may be generated in any suitable format for performing the functions described herein. For example, the metadata may be generated as "labels" for the parameters associated with the image/sensor data based on the data context.

The anonymization module 206 anonymizes the metadata to generated an anonymized form/version of the data to maintain the privacy of the in-vehicle compute system 102 (e.g., when transmitting the data to a remote computing device such as the cloud server 106). It should be appreciated that the anonymization module 206 may utilize any suitable techniques, algorithms, and/or mechanisms to anonymize the metadata or other data for transmittal or data storage. For example, in some embodiments, the anonymization module 206 may remove/delete data associated with an identity of the in-vehicle compute system 102, vehicle associated with the in-vehicle compute system 102, owner/driver of the vehicle, and/or other unique identifiers. In some embodiments, the anonymization module 206 may utilize pseudonym certificates and/or Enhanced Privacy Identification (EPID) to anonymize the metadata. For example, a pseudonym certificate may temporarily identify the vehicle (or in-vehicle compute system 102) and how the certificate may be used to locate and access data on the in-vehicle compute system 102.

The query handling module 208 is configured to handle requests from remote devices (e.g., the cloud server 106) for image and/or sensor data stored on the in-vehicle compute system 102. In some embodiments, the query handling module 208 may receive requests based on the metadata corresponding with the data requested. For example, a requesting device may include a request for images and sensor data that occurred at a particular location at a particular time. The query handling module 208 may identify the images and/or sensor data that corresponds with metadata in a particular data request. As indicated above, in some embodiments, the metadata may be anonymized such that the cloud server 106 does not know the identity of the system 102 that sent particular data or metadata.

The resource management module 210 is configured to store the captured images, collected sensor data, generated metadata, contextual information, and/or other data suitable for performing the functions described herein. In the illustrative embodiment, the resource management module 210 stores the images and sensor data in association with the corresponding metadata. In some embodiments, the resource management module 210 may process the stored data (e.g., images and sensor data) to reduce the data storage requirement (e.g., storage spaced required for the data) of the stored data. For example, the resource management module 210 may process the frames of a captured video and remove redundant frames/images (e.g., frames in which no motion is identified). Further, in some embodiments, the resource management module 210 may maintain image/sensor data collected more recently and delete such data collected less recently.

The communication module 212 handles the communication between the in-vehicle compute system 102 and other computing devices of the system 100 (e.g., the cloud server 106). For example, as described herein, the in-vehicle compute system 102 may transmit the anonymized metadata to the cloud server 106 or to an intermediate device for subsequent transmittal to the cloud server 106 (e.g., for further anonymization). Further, the communication module 212 may receive data query requests from the cloud server 106.

Figure 3:
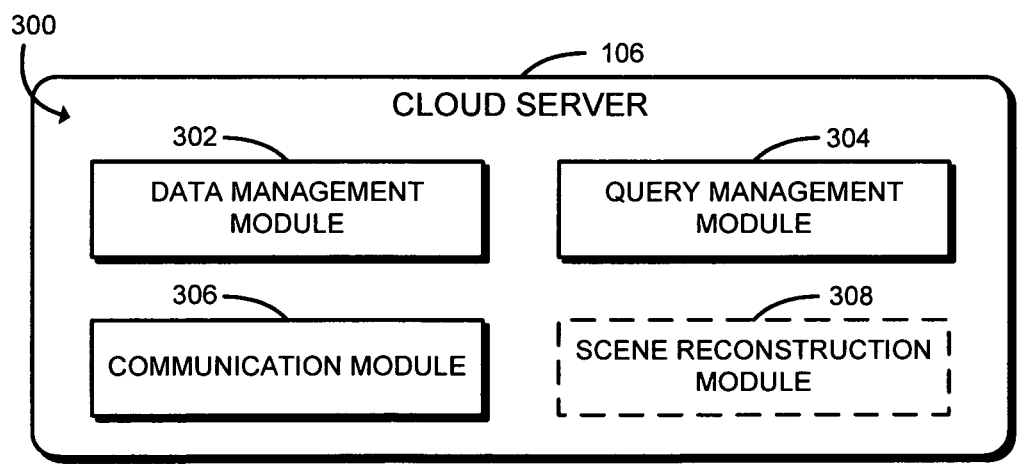
FIG. 3 is a simplified block diagram of at least one embodiment of an environment of a cloud server of the system of FIG. 1.

Referring now to FIG. 3, in use, the cloud server 106 establishes an environment 300 for scene reconstruction. The illustrative environment 300 includes a data management module 302, a query management module 304, and a communication module 306. Additionally, in some embodiments, the environment 300 may include a scene reconstruction module 308. The various modules of the environment 300 may be embodied as hardware, software, firmware, or a combination thereof. For example, the various modules, logic, and other components of the environment 300 may form a portion of, or otherwise be established by, the processor 150 or other hardware components of the cloud server 106. As such, in some embodiments, one or more of the modules of the environment 300 may be embodied as circuitry or collection of electrical devices (e.g., a data management circuitry, a query management circuitry, a communication circuitry, and/or a scene reconstruction circuitry). Additionally, in some embodiments, one or more of the illustrative modules may form a portion of another module and/or one or more of the illustrative modules may be independent of one another.

The data management module 302 is configured to store the anonymized metadata received from the in-vehicle compute systems 102. It should be appreciated that the data management module 302 may store the anonymized metadata and/or any other related data in any data structure(s) suitable for performing the functions described herein. As described below, in the illustrative embodiment, the cloud server 106 may receive a request for data associated with a particular context for reconstruction of a scene associated with that context (e.g., a query from a law enforcement agency for data associated with a traffic accident). Accordingly, the metadata may be stored in a database suitable for querying.

The query management module 304 is configured to receive requests for data associated with a particular context and identify the image/sensor data to request from the corresponding in-vehicle compute systems 102 based on the stored metadata corresponding with the context. For example, as described herein, a user of a remote compute device 108 may request image/sensor data associated with a traffic accident or other occurrence/spectacle (e.g., a meteor shower) that can be (or can potentially) be reconstructed from a given time/location. In some embodiments, the query management module 304 may query a database or other data structure on which the metadata is stored based on the context received from the requesting device to identify the corresponding metadata. In doing so, it should be appreciated that the query management module 304 may determine the metadata that corresponds with a particular image/sensor data request. As indicated above, in some embodiments, the query management module 304 may anonymously request the data from one or more in-vehicle compute systems 102 corresponding with the stored metadata.

The communication module 306 handles the communication between the cloud server 106 and other computing devices of the system 100 (e.g., the in-vehicle compute systems 102 and/or the remote compute device 108). For example, as described herein, the cloud server 106 may receive requests for image/sensor data associated with a particular context (e.g., from the remote compute device 108) and transmit anonymized requests for the image/sensor data to the corresponding in-vehicle compute systems 102.

The scene reconstruction module 308 is configured to reconstruct a multi-dimensional scene (e.g., 3D image(s), 3D video, etc.) associated with the received image/sensor data. For example, in some embodiments, the scene reconstruction module 308 may utilize two-dimensional images of a particular scene captured from different perspectives (e.g., captured by cameras 120 of different in-vehicle compute systems 102) to generate a three-dimensional image of the scene. Further, in some embodiments, the scene reconstruction module 308 may utilize several images and/or videos to generate a three-dimensional video of a particular scene. That is, the scene may be reconstructed in time and space. As indicated above, in some embodiments, the scene reconstruction module 308 may utilize various other sensor data (e.g., timing data, etc.) in conjunction with the image data to generate the multi-dimensional scene (e.g., via sensor fusion). It should be appreciated that the scene reconstruction module 308 may utilize any suitable data processing techniques, algorithms, and/or mechanisms to analyze/process the images and sensor data to generate the reconstructed scene.

Figure 4:
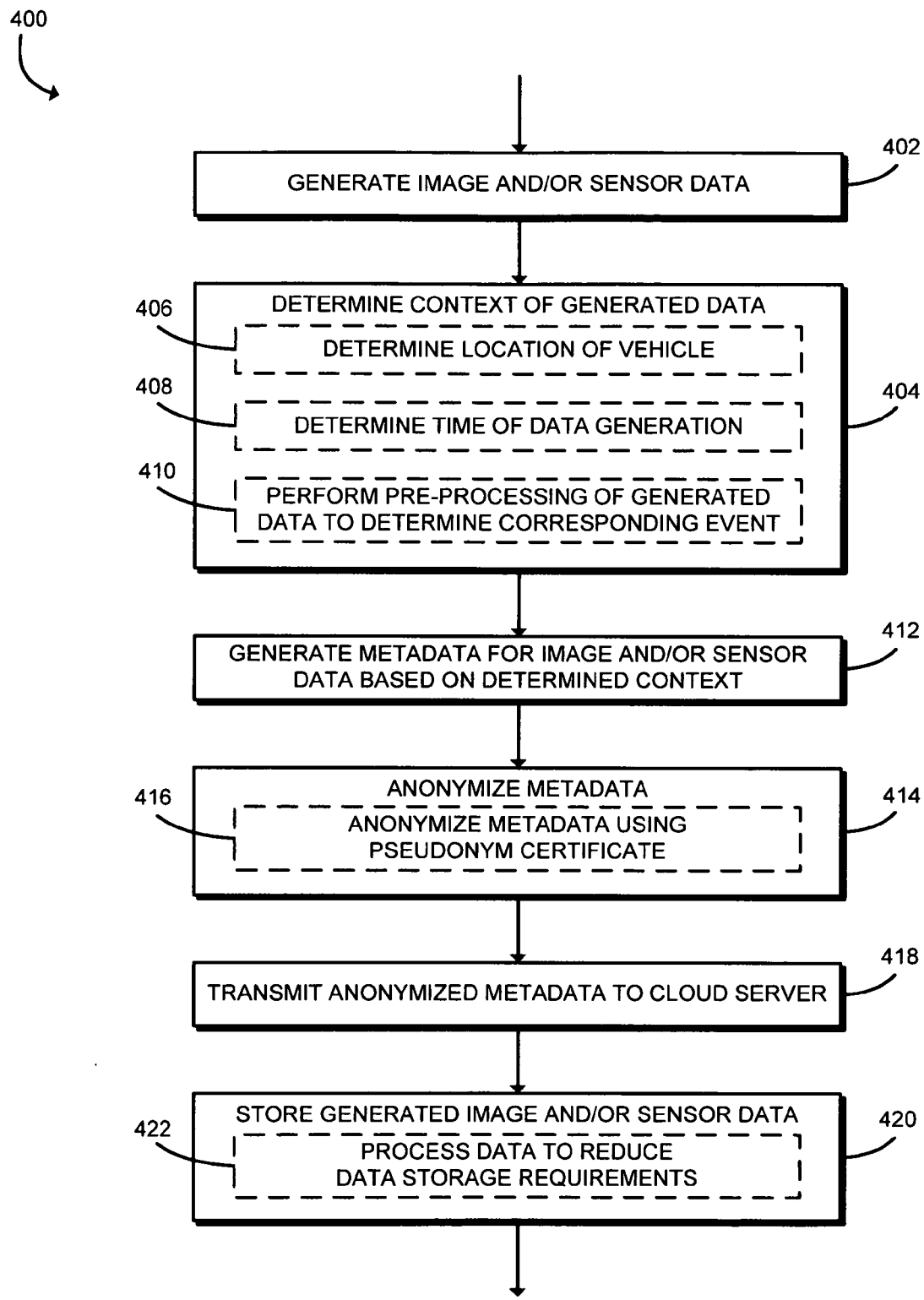
FIG. 4 is a simplified flow diagram of at least one embodiment of a method for storing data for scene reconstruction that may be executed by the in-vehicle compute system of FIG. 2.

Referring now to FIG. 4, in use, the in-vehicle compute system 102 may execute a method 400 for storing data for scene reconstruction. As indicated above, although the method 400 is described herein as being performed by an in-vehicle compute system 102 of a vehicle, in other embodiments, the method 400 may be performed by another compute device or compute system (e.g., a mobile phone). The illustrative method 400 begins with block 402 in which the in-vehicle compute system 102 generates/collects image and/or sensor data from the cameras 120 and/or sensors 122 of the in-vehicle compute system 102. In block 404, the in-vehicle compute system 102 determines the context of the generated image/sensor data. In particular, in block 406, the in-vehicle compute system 102 may determine a location of the vehicle within which the in-vehicle compute system 102 is secured. For example, the location may be determined based on GPS sensor data and/or other data generated by the sensors 122. It should be appreciated that the location may be a specific location (e.g., coordinates, street intersection, etc.) or a generic location (e.g., a city) depending on the particular embodiment. In block 408, the in-vehicle compute system 102 may determine the time at which the image/sensor data was generated. In block 410, the in-vehicle compute system 102 may perform pre-processing of the generated data to determine an event that corresponds with the image/sensor data. For example, the in-vehicle compute system 102 may determine the collected data is associated with the occurrence of a traffic accident, a meteor shower, a parade, and/or another event that may be desirable for scene reconstruction. It should be appreciated that the in-vehicle compute system 102 may utilize any suitable techniques, algorithms, and/or mechanisms for analyzing the collected data to make such event classifications.

In block 412, the in-vehicle compute system 102 generates or otherwise determines metadata for the image/sensor data based on the determined context of the data. For example, as described above, in some embodiments, the metadata may be generated as labels or parameters corresponding with the data and may vary depending on the particular embodiment.

In block 414, the in-vehicle compute system 102 may anonymize the metadata to ensure that the privacy of the owner of the vehicle, driver of the vehicle, the in-vehicle compute system 102 itself, and/or other relevant entities is protected prior to and/or during transmittal of the metadata to the cloud server 106. In doing so, in block 416, the in-vehicle compute system 102 may anonymize the data using pseudonym certificates in some embodiments. Of course, it should be appreciated that the in-vehicle compute system 102 may utilize any suitable algorithms, techniques, and/or mechanisms for anonymizing the metadata depending on the particular embodiment.

Figure 5:
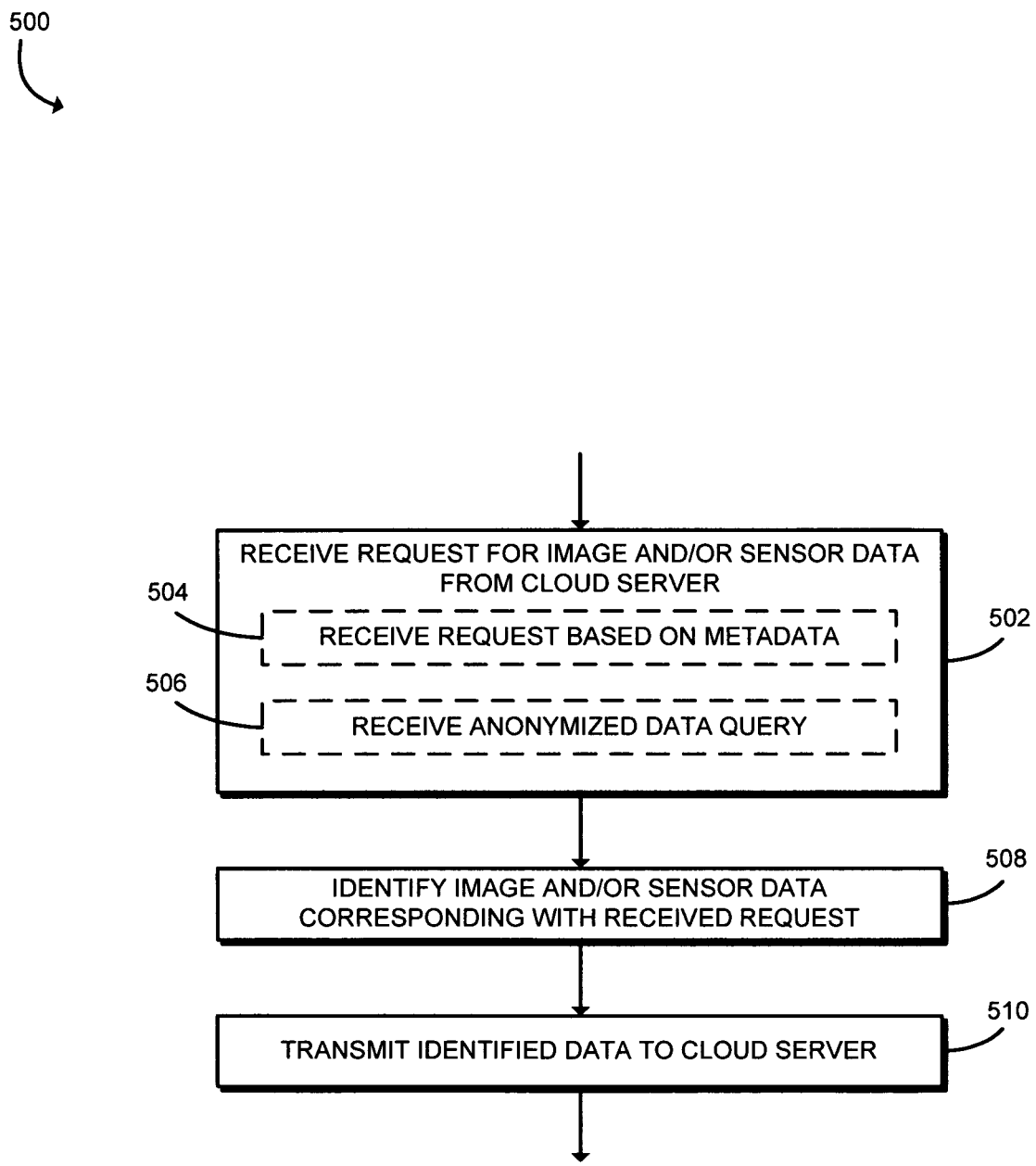
FIG. 5 is a simplified flow diagram of at least one embodiment of a method for responding to requests for data that may be executed by the in-vehicle compute system of FIG. 2.

In block 418, the in-vehicle compute system 102 may transmit the anonymized metadata to the cloud server 106. In block 420, the in-vehicle compute system 102 stores the generated image/sensor data on the memory 114 and/or data storage 116 of the in-vehicle compute system 102. In the illustrative embodiment, the in-vehicle compute system 102 may store the image/sensor data in association with the metadata determined for that image/sensor data (e.g., for responses to data requests from the cloud server 106). In some embodiments, in block 422, the in-vehicle compute system 102 may process the stored data to reduce data storage and/or other system requirements. It should be appreciated that the techniques employed may vary depending on the particular embodiment. For example, in some embodiments, the in-vehicle compute system 102 may process the frames of a captured video to remove redundant frames/images (e.g., frames in which there is no change relative to "adjacent" frames). Further, the in-vehicle compute system 102 may discard the oldest data after a predefined threshold period has lapsed. In some embodiments, by removing images/frames from all but the newest data, the in-vehicle compute system 102 may store the images at a varying framerate such that older data has a lower framerate than newer data. It should be appreciated that the in-vehicle compute system 102 may employ similar techniques for the elimination of redundant sensor data Referring now to FIG. 5, in use, the in-vehicle compute system 102 may execute a method 500 for responding to requests for data. As indicated above, although the method 500 is described herein as being performed by an in-vehicle compute system 102 of a vehicle, in other embodiments, the method 500 may be performed by another compute device or compute system (e.g., a mobile phone). The illustrative method 500 begins with block 502 in which the in-vehicle compute system 102 receives a request for image/sensor data from the cloud server 106. In doing so, in block 504, the in-vehicle compute system 102 may receive a request based on metadata or a particular context. For example, the cloud server 106 may request data from the in-vehicle compute system 102 associated with the occurrence of some event that occurred at a particular time and location. Further, as described above, in block 506, the in-vehicle compute system 102 may receive an anonymized data query from the cloud server 106. That is, the in-vehicle-compute system 102 may receive and transmit data to the cloud server 106 anonymously in order to protect the privacy of the in-vehicle compute system 102 and/or entities associated with the in-vehicle compute system 102.

In block 508, the in-vehicle compute system 102 identifies the image/sensor data corresponding with the received request. For example, as indicated above, in some embodiments, the in-vehicle compute system 102 may initially store the image/sensor data in association with the corresponding metadata (e.g., via data structure, mapping, or other correspondence) such that the metadata and/or context data may be used to identify the image/sensor data associated with that metadata. In block 510, the in-vehicle compute system 102 transmits the identified data to the cloud server 106. As described herein, in the illustrative embodiment, the in-vehicle compute system 102 transmits the identified image/sensor data anonymously.

Figure 6:
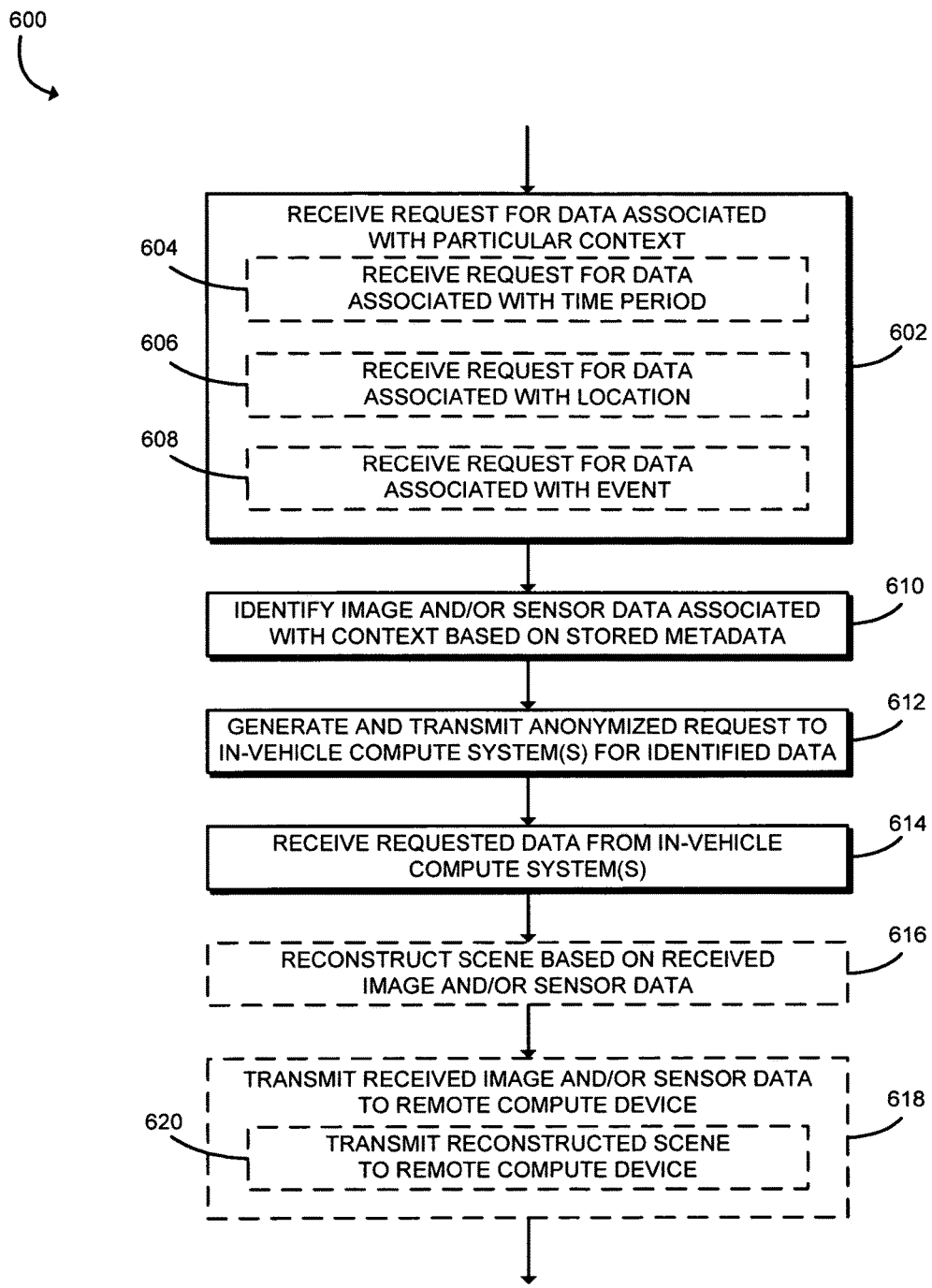
FIG. 6 is a simplified flow diagram of at least one embodiment of a method for scene reconstruction that may be executed by the cloud server of FIG. 3.

Referring now to FIG. 6, in use, the cloud server 106 may execute a method 600 for scene reconstruction. The illustrative method 600 begins with block 602 in which the cloud server 106 receives a request for data associated with a particular context. For example, as described above, the cloud server 106 may receive a request for image/sensor data associated with a traffic accident or some other occurrence of interest. Depending on the particular embodiment, the cloud server 106 may receive the request from the remote compute device 108, via a user interface of the cloud server 106, and/or from one of the in-vehicle compute systems 102. As described herein, the cloud server 106 may receive the request for data associated with a particular time or time period in block 604 and/or associated with a particular location in block 606. Further, in some embodiments, the cloud server 106 may receive a request for data associated with the occurrence of a particular event in block 608.

In block 610, the cloud server 106 may identify image/sensor data associated with the context to request based on the stored metadata. In particular, in some embodiments, the cloud server 106 may determine metadata that corresponds with the context provided in the data request and determine how to anonymously request the corresponding image/sensor data based on the stored metadata and/or data request information stored in associated with the metadata. For example, in some embodiments, the cloud server 106 may determine that multiple in-vehicle compute systems 102 have image/sensor data associated with a particular context (e.g., from different perspectives) such that the data should be requested from each of those in-vehicle compute systems 102 to reconstruct the scene. In block 612, the cloud server 106 transmits an anonymized request to each of the in-vehicle compute systems 102 that have image/sensor data associated with the context/metadata. As described herein, it should be appreciated that the cloud server 106 may utilize any suitable techniques to perform such an anonymized request.

In block 614, the cloud server 106 may receive the requested image/sensor data from the in-vehicle compute systems 102. In some embodiments, the cloud server 106 receives the image/sensor data anonymously to maintain the privacy of the in-vehicle compute systems 102. Further, in some embodiments, the cloud server 106 may receive the image/sensor data from the in-vehicle compute systems 102 via some intermediary device.

In block 616, the cloud server 106 may reconstruct the scene based on the received image/sensor data. As described above, in some embodiments, the cloud server 106 may reconstruct a multi-dimensional scene associated with the received image/sensor data based on any suitable techniques. For example, in the illustrative embodiment, the image data received from each of the in-vehicle compute systems 102 may be from a different perspective of the scene, which may be used in conjunction with other sensor data (e.g., timing data, location data, etc.) to permit a three-dimensional reconstruction of a particular scene over time. In particular, in some embodiments, the cloud server 106 may reconstruct a three-dimensional video of the scene based on the received image/sensor data. It should be appreciated that, in some embodiments, the cloud server 106 may further overlay or incorporate additional sensor data on the reconstructed scene depending on the particular embodiment and data collected. For example, in some embodiments, the cloud server 106 may also generate a temperature map to overlay the multi-dimensional scene. Of course, it should be appreciated that, in some embodiments, the cloud server 106 may not be responsible for the reconstruction of the scene. In such embodiments, the cloud server 106 may transmit the received image/sensor data to the compute device/system responsible for such scene reconstruction (e.g., the remote compute device 108). In some embodiments, in block 618, the cloud server 106 may transmit the received image/sensor data to the remote compute device 108. In doing so, in block 620, the cloud server 106 may transmit the reconstructed scene to the remote compute device 108.

EXAMPLES

Illustrative examples of the technologies disclosed herein are provided below. An embodiment of the technologies may include any one or more, and any combination of, the examples described below.

Example 1 includes a compute system for scene reconstruction, the compute system comprising at least one camera; a metadata module to (i) determine a context of at least one image of a scene captured by the at least one camera and (ii) generate metadata for the at least one image that is indicative of the determined context; an anonymization module to anonymize the metadata to generate anonymized data that maintains privacy of the compute system; and a communication module to transmit the anonymized data to a cloud server for multi-dimensional reconstruction of the scene.

Example 2 includes the subject matter of Example 1, and wherein to determine the context comprises to determine a location of the compute system.

Example 3 includes the subject matter of any of Examples 1 and 2, and wherein to determine the context comprises to determine a capture time of the at least one image.

Example 4 includes the subject matter of any of Examples 1-3, and further including at least one sensor, wherein to determine the context comprises to determine a context of the at least one image and sensor data generated by the least one sensor.

Example 5 includes the subject matter of any of Examples 1-4, and further including a data processing module to pre-process the at least one image to determine an event associated with the determined context.

Example 6 includes the subject matter of any of Examples 1-5, and wherein to anonymize the metadata comprises to anonymize the metadata based on a pseudonym certificate.

Example 7 includes the subject matter of any of Examples 1-6, and further including a resource management module to store the at least one image in conjunction with the metadata in a data storage of the compute system.

Example 8 includes the subject matter of any of Examples 1-7, and wherein the resource management module is further to process the at least one stored image to reduce a data storage requirement of the at least one stored image.

Example 9 includes the subject matter of any of Examples 1-8, and further including a query handling module to receive a request for the at least one image from a cloud server; wherein the communication module is to transmit the at least one image to the cloud server.

Example 10 includes the subject matter of any of Examples 1-9, and wherein to receive the request comprises to receive a request for data associated with reference metadata; and wherein the query handling module is further to identify the at least one image based on the reference metadata.

Example 11 includes the subject matter of any of Examples 1-10, and wherein the compute system is embodied as an in-vehicle compute system.

Example 12 includes the subject matter of any of Examples 1-11, and wherein the compute system is embodied as a mobile compute device.

Example 13 includes a method for participating in scene reconstruction, the method comprising determining, by a compute system, a context of at least one image of a scene captured by a camera of the compute system; generating, by the compute system, metadata for the at least one image based on the determined context, wherein the metadata identifies the determined context of the compute system; anonymizing, by the compute system, the metadata to generate anonymized data that maintains privacy of the compute system; and transmitting, by the compute system, the anonymized data to a cloud server for multi-dimensional reconstruction of the scene.

Example 14 includes the subject matter of Examples 13, and wherein determining the context comprises determining a location of the compute system.

Example 15 includes the subject matter of any of Examples 13 and 14, and wherein determining the context comprises determining a capture time of the at least one image.

Example 16 includes the subject matter of any of Examples 13-15, and wherein determining the context comprises determining a context of the at least one image and sensor data generated by at least one sensor of the compute system.

Example 17 includes the subject matter of any of Examples 13-16, and further including pre-processing the at least one image, by the compute system, to determine an event associated with the determined context.

Example 18 includes the subject matter of any of Examples 13-17, and wherein anonymizing the metadata comprises anonymizing the metadata based on a pseudonym certificate.

Example 19 includes the subject matter of any of Examples 13-18, and further including storing, by the compute system, the at least one image in conjunction with the metadata in a data storage of the compute system.

Example 20 includes the subject matter of any of Examples 13-19, and further including processing, by the compute system, the at least one stored image to reduce a data storage requirement of the at least one stored image.

Example 21 includes the subject matter of any of Examples 13-20, and further including receiving, by the compute system and from a cloud server, a request for the at least one image; and transmitting, by the compute system, the at least one image to the cloud server.

Example 22 includes the subject matter of any of Examples 13-21, and wherein receiving the request comprises receiving a request for data associated with reference metadata; and further comprising identifying the at least one image based on the reference metadata.

Example 23 includes the subject matter of any of Examples 13-22, and wherein the compute system is embodied as an in-vehicle compute system.

Example 24 includes the subject matter of any of Examples 13-23, and wherein the compute system is embodied as a mobile compute device.

Example 25 includes a computing device comprising a processor; and a memory having stored therein a plurality of instructions that when executed by the processor cause the computing device to perform the method of any of Examples 13-24.

Example 26 includes one or more machine-readable storage media comprising a plurality of instructions stored thereon that in response to being executed result in a computing device performing the method of any of Examples 13-24.

Example 27 includes a computing device comprising means for performing the method of any of Examples 13-24.

Example 28 includes a compute system for scene reconstruction, the compute system comprising means for determining a context of at least one image of a scene captured by a camera of the compute system; means for generating metadata for the at least one image based on the determined context, wherein the metadata identifies the determined context of the compute system; means for anonymizing the metadata to generate anonymized data that maintains privacy of the compute system; and means for transmitting the anonymized data to a cloud server for multi-dimensional reconstruction of the scene.

Example 29 includes the subject matter of Example 28, and wherein the means for determining the context comprises means for determining a location of the compute system.

Example 30 includes the subject matter of any of Examples 28 and 29, and wherein the means for determining the context comprises means for determining a capture time of the at least one image.

Example 31 includes the subject matter of any of Examples 28-30, and wherein the means for determining the context comprises means for determining a context of the at least one image and sensor data generated by at least one sensor of the compute system.

Example 32 includes the subject matter of any of Examples 28-31, and further including means for pre-processing the at least one image to determine an event associated with the determined context.

Example 33 includes the subject matter of any of Examples 28-32, and wherein the means for anonymizing the metadata comprises means for anonymizing the metadata based on a pseudonym certificate.

Example 34 includes the subject matter of any of Examples 28-33, and further including means for storing the at least one image in conjunction with the metadata in a data storage of the compute system.

Example 35 includes the subject matter of any of Examples 28-34, and further including means for processing the at least one stored image to reduce a data storage requirement of the at least one stored image.

Example 36 includes the subject matter of any of Examples 28-35, and further including means for receiving, from a cloud server, a request for the at least one image; and means for transmitting the at least one image to the cloud server.

Example 37 includes the subject matter of any of Examples 28-36, and wherein the means for receiving the request comprises means for receiving a request for data associated with reference metadata; and further comprising means for identifying the at least one image based on the reference metadata.

Example 38 includes the subject matter of any of Examples 28-37, and wherein the compute system is embodied as an in-vehicle compute system.

Example 39 includes the subject matter of any of Examples 28-38, and wherein the compute system is embodied as a mobile compute device.

Example 40 includes a cloud server for scene reconstruction, the cloud server comprising a query management module to (i) receive, from a first compute system, a request for data associated with a particular context for reconstruction of a scene associated with the particular context and (ii) identify at least one image to request from a second compute system associated with the particular context; and a communication module to (i) transmit an anonymized request for the at least one image to the second compute system and (ii) receive the at least one image from the second compute system.

Example 41 includes the subject matter of Example 40, and wherein to identify the at least one image comprises to identify metadata associated with the at least one image; and wherein to transmit the anonymized request comprises to transmit an anonymized request for at least one image associated with the metadata.

Example 42 includes the subject matter of any of Examples 40 and 41, and wherein to receive the request comprises to receive a request for data associated with a particular time period.

Example 43 includes the subject matter of any of Examples 40-42, and wherein to receive the request comprises to receive a request for data associated with a particular location.

Example 44 includes the subject matter of any of Examples 40-43, and wherein to receive the request comprises to receive a request for data associated with an occurrence of a particular event.

Example 45 includes the subject matter of any of Examples 40-44, and further including a scene reconstruction module to reconstruct the scene based on the at least one image.

Example 46 includes the subject matter of any of Examples 40-45, and wherein the communication module is to transmit the at least one image to the first compute system.

Example 47 includes the subject matter of any of Examples 40-46, and wherein to identify the at least one image to request from the compute system comprises to identify at least one image and sensor data to request from the second compute system associated with the particular context.

Example 48 includes the subject matter of any of Examples 40-47, and wherein the query handling module is further to identify at least one other image to request from a third compute system associated with the particular context; and wherein the communication module is further to (i) transmit another anonymized request for the at least one other image to the third compute system (ii) receive the at least one other image from the third compute system.

Example 49 includes the subject matter of any of Examples 40-48, and further including a scene reconstruction module to reconstruct the scene based on the at least one image and the at least one other image.

Example 50 includes a method for scene reconstruction, the method comprising receiving, by a cloud server and from a first compute system, a request for data associated with a particular context for reconstruction of a scene associated with the particular context; identifying, by the cloud server, at least one image to request from a second compute system associated with the particular context; transmitting, by the cloud server, an anonymized request for the at least one image to the second compute system; and receiving, by the cloud server, the at least one image from the second compute system.

Example 51 includes the subject matter of Example 50, and wherein identifying the at least one image comprises identifying metadata associated with the at least one image; and wherein transmitting the anonymized request comprises transmitting an anonymized request for at least one image associated with the metadata.

Example 52 includes the subject matter of any of Examples 50 and 51, and wherein receiving the request comprises receiving a request for data associated with a particular time period.

Example 53 includes the subject matter of any of Examples 50-52, and wherein receiving the request comprises receiving a request for data associated with a particular location.

Example 54 includes the subject matter of any of Examples 50-53, and wherein receiving the request comprises receiving a request for data associated with an occurrence of a particular event.

Example 55 includes the subject matter of any of Examples 50-54, and further including reconstructing, by the cloud server, the scene based on the at least one image.

Example 56 includes the subject matter of any of Examples 50-55, and further including transmitting, by the cloud server, the at least one image to the first compute system.

Example 57 includes the subject matter of any of Examples 50-56, and wherein identifying the at least one image to request from the compute system comprises identifying at least one image and sensor data to request from the second compute system associated with the particular context.

Example 58 includes the subject matter of any of Examples 50-57, and further including identifying, by the cloud server, at least one other image to request from a third compute system associated with the particular context; and transmitting, by the cloud server, another anonymized request for the at least one other image to the third compute system; and receiving, by the cloud server, the at least one other image from the third compute system.

Example 59 includes the subject matter of any of Examples 50-58, and further including reconstructing, by the cloud server, the scene based on the at least one image and the at least one other image.

Example 60 includes a computing device comprising a processor; and a memory having stored therein a plurality of instructions that when executed by the processor cause the computing device to perform the method of any of Examples 50-59.

Example 61 includes one or more machine-readable storage media comprising a plurality of instructions stored thereon that in response to being executed result in a computing device performing the method of any of Examples 50-59.

Example 62 includes a computing device comprising means for performing the method of any of Examples 50-59.

Example 63 includes a cloud server for scene reconstruction, the cloud server comprising means for receiving, from a first compute system, a request for data associated with a particular context for reconstruction of a scene associated with the particular context; means for identifying at least one image to request from a second compute system associated with the particular context; means for transmitting an anonymized request for the at least one image to the second compute system; and means for receiving the at least one image from the second compute system.

Example 64 includes the subject matter of Example 63, and wherein the means for identifying the at least one image comprises means for identifying metadata associated with the at least one image; and wherein the means for transmitting the anonymized request comprises means for transmitting an anonymized request for at least one image associated with the metadata.

Example 65 includes the subject matter of any of Examples 63 and 64, and wherein the means for receiving the request comprises means for receiving a request for data associated with a particular time period.

Example 66 includes the subject matter of any of Examples 63-65, and wherein the means for receiving the request comprises means for receiving a request for data associated with a particular location.

Example 67 includes the subject matter of any of Examples 63-66, and wherein the means for receiving the request comprises means for receiving a request for data associated with an occurrence of a particular event.

Example 68 includes the subject matter of any of Examples 63-67, and further including means for reconstructing the scene based on the at least one image.

Example 69 includes the subject matter of any of Examples 63-68, and further including means for transmitting the at least one image to the first compute system.

Example 70 includes the subject matter of any of Examples 63-69, and wherein the means for identifying the at least one image to request from the compute system comprises means for identifying at least one image and sensor data to request from the second compute system associated with the particular context.

Example 71 includes the subject matter of any of Examples 63-70, and further including means for identifying at least one other image to request from a third compute system associated with the particular context; and means for transmitting another anonymized request for the at least one other image to the third compute system; and means for receiving the at least one other image from the third compute system.

Example 72 includes the subject matter of any of Examples 63-71, and further including means for reconstructing the scene based on the at least one image and the at least one other image.

The invention claimed is:

1. A compute system for scene reconstruction, the compute system comprising:
   at least one camera;
   a metadata module to (i) determine a context of at least one image of a scene captured by the at least one camera and (ii) generate metadata for the at least one image that is indicative of the determined context;
   an anonymization module to anonymize the metadata to generate anonymized data that maintains privacy of the compute system without modification to the at least one image; and
   a communication module to transmit the anonymized data to a cloud server for multi-dimensional reconstruction of the scene.

2. The compute system of claim 1, wherein to determine the context comprises to determine a location of the compute system and a capture time of the at least one image.

3. The compute system of claim 1, further comprising at least one sensor, wherein to determine the context comprises to determine a context of the at least one image and sensor data generated by the least one sensor.

4. The compute system of claim 1, further comprising a data processing module to pre-process the at least one image to determine an event associated with the determined context.

5. The compute system of claim 1, wherein to anonymize the metadata comprises to anonymize the metadata based on a pseudonym certificate.

6. The compute system of claim 1, further comprising a resource management module to (i) store the at least one image in conjunction with the metadata in a data storage of the compute system and (ii) process the at least one stored image to reduce a data storage requirement of the at least one stored image.

7. The compute system of claim 1, further comprising a query handling module to receive a request for the at least one image from a cloud server;
   wherein the communication module is to transmit the at least one image to the cloud server.

8. The compute system of claim 7, wherein to receive the request comprises to receive a request for data associated with reference metadata; and
   wherein the query handling module is further to identify the at least one image based on the reference metadata.

9. The compute system of claim 1, wherein the compute system is embodied as an in-vehicle compute system.

10. The compute system of claim 1, wherein the compute system is embodied as a mobile compute device.

11. One or more non-transitory, machine-readable storage media comprising a plurality of instructions stored thereon that, in response to execution by a compute system, cause the compute system to:
    determine a context of at least one image of a scene captured by a camera of the compute system;
    generate metadata for the at least one image based on the determined context, wherein the metadata identifies the determined context of the compute system;
    anonymize the metadata to generate anonymized data that maintains privacy of the compute system without modification to the at least one image; and
    transmit the anonymized data to a cloud server for multi-dimensional reconstruction of the scene.

12. The one or more non-transitory, machine-readable storage media of claim 11, wherein to determine the context comprises to determine a location of the compute system and a capture time of the at least one image.

13. The one or more non-transitory, machine-readable storage media of claim 11, wherein to determine the context comprises to determine a context of the at least one image and sensor data generated by at least one sensor of the compute system.

14. The one or more non-transitory, machine-readable storage media of claim 11, wherein to anonymize the metadata comprises to anonymize the metadata based on a pseudonym certificate.

15. A method for participating in scene reconstruction, the method comprising:
    determining, by a compute system, a context of at least one image of a scene captured by a camera of the compute system;
    generating, by the compute system, metadata for the at least one image based on the determined context, wherein the metadata identifies the determined context of the compute system;
    anonymizing, by the compute system, the metadata to generate anonymized data that maintains privacy of the compute system without modifying the at least one image; and
    transmitting, by the compute system, the anonymized data to a cloud server for multi-dimensional reconstruction of the scene.

16. The method of claim 15, further comprising:
    receiving, by the compute system and from a cloud server, a request for the at least one image; and
    transmitting, by the compute system, the at least one image to the cloud server.

17. The method of claim 16, wherein receiving the request comprises receiving a request for data associated with reference metadata; and
    further comprising identifying the at least one image based on the reference metadata.

18. A cloud server for scene reconstruction, the cloud server comprising:
- a query management module to (i) receive, from a first compute system, a request for data associated with a particular context for reconstruction of a scene associated with the particular context, (ii) identify at least one image to request from a second compute system associated with the particular context, and (iii) to identify at least one other image to request from a third compute system associated with the particular context;
- a communication module to (i) transmit an anonymized request for the at least one image to the second compute system, (ii) receive the at least one image from the second compute system, (iii) transmit another anonymized request for the at least one other image to the third compute system, and (iv) receive the at least one other image from the third compute system; and
- a scene reconstruction module to reconstruct the scene based on the at least one image and the at least one other image.

19. The cloud server of claim 18, wherein to identify the at least one image comprises to identify metadata associated with the at least one image; and
- wherein to transmit the anonymized request comprises to transmit an anonymized request for at least one image associated with the metadata.

20. The cloud server of claim 18, wherein to receive the request comprises to receive a request for data associated with a particular time period and a particular location.

21. The cloud server of claim 18, wherein to receive the request comprises to receive a request for data associated with an occurrence of a particular event.

22. The cloud server of claim 18, wherein the communication module is to transmit the at least one image to the first compute system.

23. The cloud server of claim 18, wherein to identify the at least one image to request from the compute system comprises to identify at least one image and sensor data to request from the second compute system associated with the particular context.

* * * * *